United States Patent [19]
Ham

[11] 3,763,432
[45] Oct. 2, 1973

[54] INDICATOR DRIVE AND POSITIVE-ZERO RESET MECHANISM FOR A DEMAND METER

[75] Inventor: Donald M. Ham, Rochester, N.H.

[73] Assignee: General Electric Co., Pittsfield, Mass.

[22] Filed: Apr. 6, 1972

[21] Appl. No.: 241,709

[52] U.S. Cl. .............................. 324/103 R, 74/409
[51] Int. Cl. ..................... G01r 19/16, F16h 55/18
[58] Field of Search .................. 324/103 R; 74/409; 235/144 MA

[56] References Cited
UNITED STATES PATENTS
| | | | |
|---|---|---|---|
| 3,423,019 | 1/1969 | Ham | 324/103 R |
| 3,105,731 | 10/1963 | Bertrang | 74/409 |
| 2,763,161 | -9/1956 | Bergson | 74/409 |

OTHER PUBLICATIONS
Gutmann, F. T.; "18 Ways to Control...;" Product Engineering; Oct. 26, 1959; pg. 71–75.

Primary Examiner—Rudolph V. Rolinec
Assistant Examiner—Ernest F. Karlsen
Attorney—Francis X. Doyle et al.

[57] ABSTRACT

A demand meter is provided with an indicator drive and positive-zero reset mechanism that is characterized by incorporating an anti-backlash gear assembly, which enables an indicating pointer on the meter to be reset precisely to its zero-indicating position without introducing any error into subsequent meter readings, due to relative movement between the gears of the indicating pointer drive gear train. The reset mechanism is further characterized by incorporating a simple adjusting means that is readily accessible from the front of the meter so that an operator can easily calibrate the position of the demand-indicating pointer relative to an associated indicating scale. A self-counterbalancing indicating pointer is mounted on the first dial shaft of the indicator drive gear train and is operable, in combination with the indicator drive and reset mechanism, to prevent the pointer from being moved in response to mechanical vibration of the meter.

7 Claims, 6 Drawing Figures

Patented Oct. 2, 1973

INDICATOR DRIVE AND POSITIVE-ZERO RESET MECHANISM FOR A DEMAND METER

BACKGROUND OF THE INVENTION

The present invention relates to an indicating kilowatt demand meter of the integrating type. More particularly, the invention relates to an indicator drive and positive-zero reset mechanism for such a demand meter.

Two types of indicating registers are in common use on electric demand meters at the present time. One of these types of registers comprises a plurality of dial registers associated with indicating pointers that are driven in an upscale direction by a decade gear train. The second type of demand meter register in common use is a simple indicating pointer associated with an arcuate indicating scale that is calibrated to indicate the maximum up-scale movement of the pointer.

It is normal practice in the field of demand metering to mount demand registers in driven relationship with conventional watthour meter drive mechanisms, and in combination with a timing element that is operable to automatically reset a demand sensing pointer-pusher to its start position at pre-selected time intervals. Typically, such a pre-selected time interval is either 15 or 30 minutes in duration. In addition to an automatic interval reset mechanism, demand meters must include some type of manual reset mechanism for returning their sweep indicating pointer, or dial register pointers, to a zero-indicating position at the end of a given period for which maximum demand is measured by the meter. Normally, such a manual reset mechanism is used to return the indicating pointer or pointers to their "zero" position at the end of a billing period, for example at the end of each month.

A potential source of error in the demand meter measurements indicated by demand meters is the slack, or play, normally present between the respective gears of conventional indicator pointer drive gear trains. This potential source of error has been recognized for some time and various mechanisms have been devised in an attempt to eliminate, or counteract, it. One example of such a prior art zero-reset mechanism is disclosed in co-pending U.S. Patent application Ser. No. 174,460, which was filed on Aug. 24, 1971 and is assigned to the same assignee as the present invention. That application is entitled "Zero-Reset Mechanism for an Indicating Demand Register." In general, the zero-reset mechanism disclosed in that prior art application utilizes a pre-loaded spring member that is operable in cooperation with an adjustable stop member to return an indicating pointer of a demand meter dial register to its zero-indicating position after the pointer has been rotated in a down-scale direction sufficiently far to overdrive the zero-indicating position enough to remove all backlash, or play, from between the gears of the indicator drive gear train.

One commonly encountered difficulty associated with all known prior art demand meter indicator drive and indicating pointer reset mechanisms is the need to balance the desirability of low friction losses against the need for stable positioning of the indicating pointers when they are subjected to vibration during use. This basic problem is accentuated by the presence of play between the meshing gears of conventional demand meter indicator drive gear trains. In fact, it has been found that due to the extremely high gear ratio inherent in dial type demand meters (wherein one of the indicating pointers of the register is required to make 100 revolutions in response to movement of a shaft at the other end of the gear train through an angle of 270°), it is possible for a slightly unbalanced load on the shaft of the unit dial pointer to exert a torque on the gear train that will cause it to move. Thus, if such a meter is subjected to repeated jarring or vibration, it is possible that merely the weight of an unbalanced indicating pointer could cause the meter to record an erroneous reading, due to vibration-induced mechanical movement of the pointer. In order to prevent such undesirable errors from being introduced into meter readings, it is now common practice to utilize various forms of friction brakes in association with the indicator drive gear trains of demand meters. Of course, such brakes inevitably apply a power-consuming load on the watthour meter drive mechanism that is used to drive the indicator drive gear train. Thus, it is apparent that it would be desirable to provide some means, other than a mechanical braking means, for stabilizing the position of demand water indicating pointers to make them resistant to movement in response to register vibration.

Another disadvantage of presently known demand meters is that they frequently incorporate calibrating means that are relatively inaccessible, and, therefore, difficult to adjust. Many such prior art calibrating means are situated behind the register face of a demand meter, within the indicator drive gear train; accordingly, it is often difficult to make an adjustment on the calibrating means while at the same time observing the position of the indicating pointers relative to the register scale. Although the desirability of locating a calibrating means on the front of a demand meter has long been recognized, most prior art calibrating means would not conveniently accommodate such an arrangement. However, the above-referenced patent application does disclose a demand meter reset mechanism that incorporates a pointer-position calibrating means which is readily accessible from the front of a demand meter.

An object of the present invention is to provide an improved indicator drive and positive-zero reset mechanism for a demand meter that overcomes all of the above-mentioned disadvantages of related prior art mechanisms.

Another objective of the present invention is to provide an indicator drive and positive-zero reset mechanism that is sufficiently vibration resistant to prevent error from being introduced into meter readings due to mechanical vibration of the meter.

A further object of the invention is to provide an indicator drive and positive-zero reset mechanism that has relatively low friction losses and is sufficiently vibration-resistant to prevent the indicating pointers of the meter from being moved in response to mechanical vibration of the meter.

Yet another object of the invention is to provide an indicator drive and positive-zero reset mechanism that includes an anti-backlash gear assembly that is operable to prevent any error from being introduced into the indicating measure shown by the meter when the indicating pointer is reset to its zero-indicating position.

A still further object of the invention is to provide an indicator drive and positive-zero reset mechanism for a demand meter in which an indicating pointer calibrating adjustment means is positioned at the front of the meter, where it is readily accessible to an operator calibrating the meter and simultaneously observing the position of the indicating pointers relative to their register scales.

Additional objects and advantages of the invention will be apparent to those skilled in the art from the description of it that follows taken in conjunction with the accompanying drawings.

SUMMARY OF THE INVENTION

In one preferred embodiment of the invention, a demand meter is provided with an indicator drive and positive-zero reset mechanism that includes an anti-backlash gear assembly, which is operable to prevent error from being introduced into indications of demand registered by the meter. A manually operable adjusting means is positioned at the front of the meter to enable a demand indicating pointer to be calibrated relative to its associated dial scale by an operator standing in front of the meter in a position where he can readily observe the position of the pointer being calibrated. In one form of the invention, a self-counterbalancing indicating pointer is mounted on a digit indicating dial of the meter register in order to make the meter less susceptible to pointer displacement due to vibration of the meter.

DESCRIPTION OF THE PREFERRED EMBODIMENT

Figure 1:
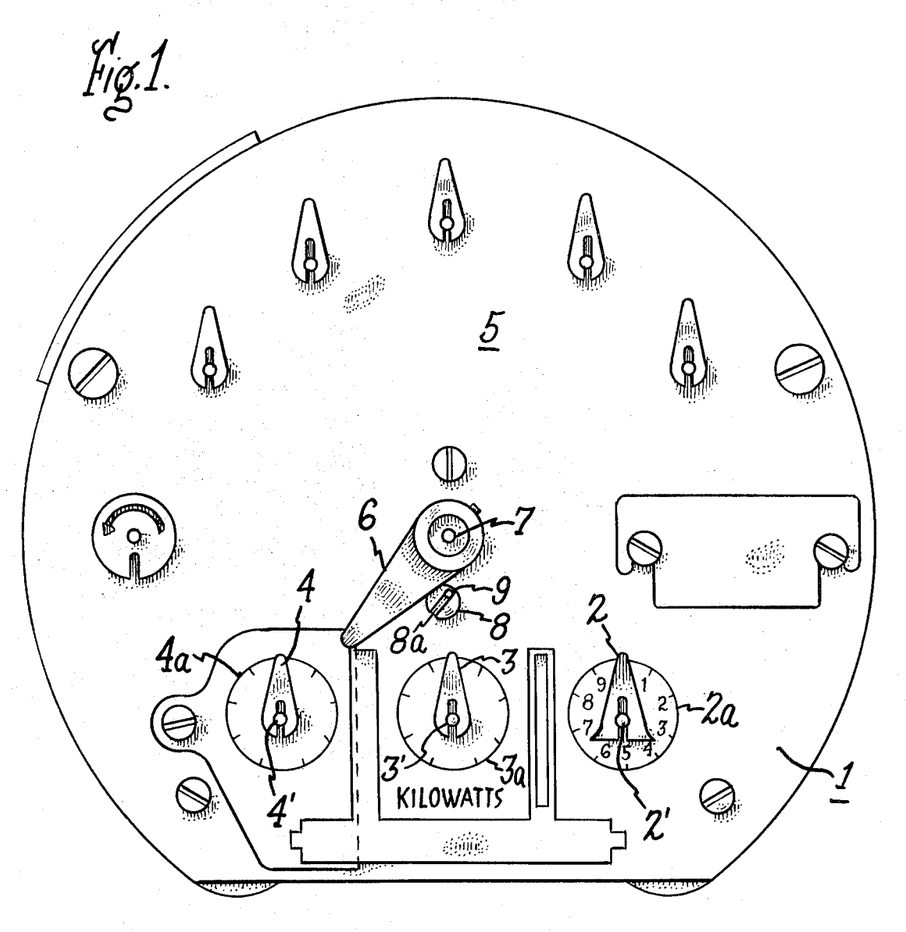
FIG. 1 is a front plan view of a demand meter face plate illustrating the indicating pointers and pointer calibrating adjusting means of the present invention.

FIG. 1 illustrates the face of an electric demand meter having a multi-dial register 1, comprising a plurality of indicating pointers 2, 3 and 4, which are rotatably mounted to cooperate with numbered dial scales 2a, 3a and 4a. The scales 2a–4a may be divided in any suitable manner, but in the preferred embodiment of the invention, they are decade scales. Indicating pointers 2–4 are rotatably mounted by being clamped on rotatable shafts 2', 3' and 4', respectively. The relationship of rotatable shafts 2'–4' to a drive gear train will be described in further detail below.

In order to periodically reset the indicating pointers 2–4 to their zero-indicating position, a manually operable lever 6 is mounted in fixed relationship with respect to a rotatable drive shaft 7. This shaft is positioned through the center of the demand meter face plate 5, above the center indicating pointer 3. The operation of lever 6 will be described in detail later, but at this point it need only be understood that lever 6 is coupled to the gear train that drives the indicating pointers 2–4, so that when lever 6 is manually rotated in a counter-clockwise direction (as seen in FIG. 1) it operates to move the indicating pointers 2–4 in their respective downscale directions to a zero-indicating position. An adjustable stop member 8 is mounted adjacent to the lever 6 and is operable to arrest rotation of the lever 6 when it comes into contact with it. (This relationship between the stop member 8 and the lever 6 may also be seen in FIG. 2 of the drawing.) The stop member 8 comprises an eccentrically mounted cam that is rotatably supported by a pin 9, about which it rotates when a screwdriver or other torque producing means is twisted in the slot 8a in member 8 to cause such rotation. Thus, it should be apparent that the slot 8a and pin 9 constitute an adjusting means for manually adjusting the position of stop member 8 relative to the lever 6, in order to vary the point in the range of rotation of lever 6 at which it contacts the stop member 8 and is arrested by it during an indicating-pointer-reset operation. The remaining features of the face plate 5 illustrated in FIG. 1 are not important to an understanding of the present invention. Accordingly, no further discussion regarding these features will be presented herein.

Figure 2:
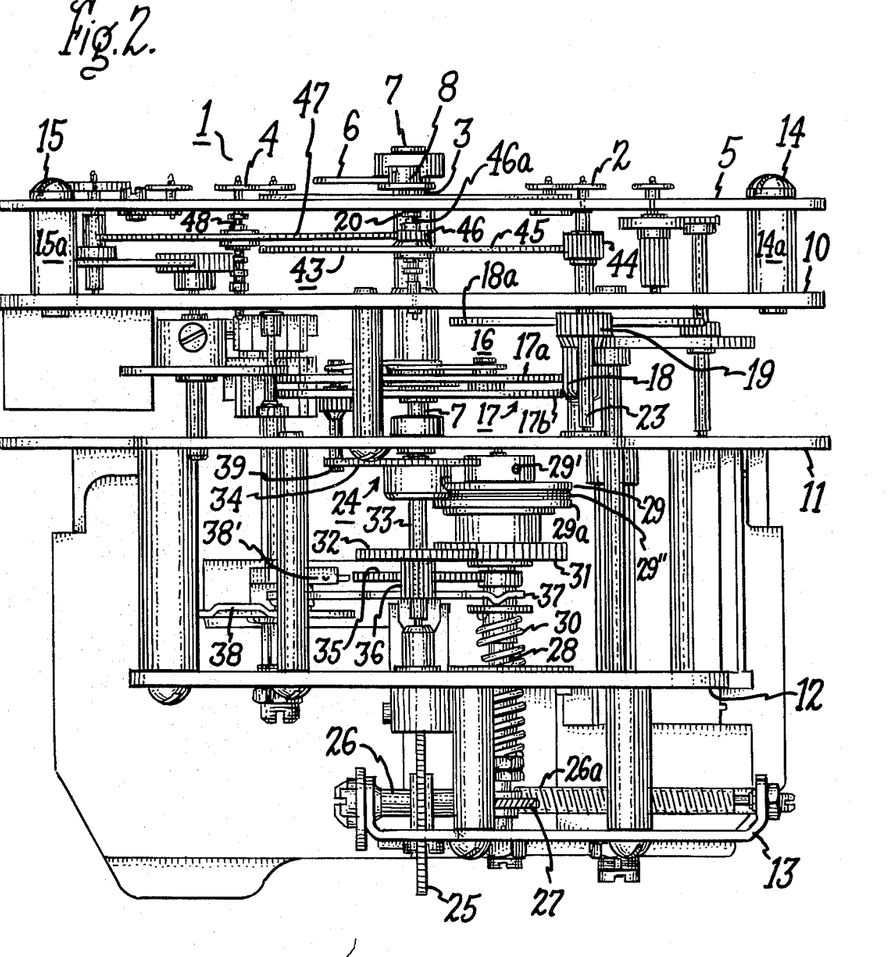
FIG. 2 is a bottom elevation view of a demand meter indicator drive and zero reset mechanism constructed pursuant to the present invention, and illustrated with respect to the face plate and indicating pointers shown in FIG. 1, as well as in relation to a conventional pointer-pusher type of drive mechanism.

Reference will now be made to FIG. 2 of the drawing in order to describe additional features of the invention. It should be understood that throughout the description of the invention presented herein, like reference numerals are used to identify identical parts in all of the separate figures of the drawings. Thus, the face plate 5 shown in FIG. 2 is depicted in the same relationship to indicating pointers 2–4 of dial register 1 that was illustrated in FIG. 1. As is conventional practice in the demand meter art, the face plate 5 is rigidly mounted in spaced-apart relationship to a plurality of metal housing plates 10, 11, 12 and 13. These plates 10–13 are held in their rigid spaced-apart relationship by any suitable means, which in the preferred embodiment of the invention includes a plurality of threaded screws and spacing cylinders. All of these spacing means are not identified by number, although most of them are shown; however, by way of example, a pair of the mounting screws 14 and 15, and associated spacing cylinders 14a and 15a, are shown mounted in operating relationship between the face plate 5 and mounting plate 10, in FIG. 2.

In order to rotate the indicating pointers 2–4 of dial register 1, a drive gear train 16 is operatively coupled to rotate the pointers in response to the gear train being driven. Gear train 16 comprises an anti-backlash gear assembly 17, a pinion gear 18 (also see FIG. 3), a disc gear 18a and a pinion gear 19 that is mounted on rotatable shaft 23. It will be understood that the plurality of gears of gear train 16 are suitably mounted in meshing relationship to rotate digit indicating pointer 2 in an upscale direction. In the preferred embodiment of the invention, the anti-backlash gear assembly 17 comprises the shaft 7, a first disc gear 17a, a second disc gear 17b and an elongated spring member 17c. The spring member 17c is connected to both the first disc gear 17a and the second disc gear 17b to bias them in opposite directions of rotation about shaft 7. The structure and mounting arrangement of spring member 17c, as well as its coupling arrangement to the disc gears 17a and 17b, will be described in more detail below. At this point, it need only be understood that the gears 17a and 17b (in the preferred form being discussed) are substantially equal in diameter and each of them contains the same number, and substantially the same shape, of teeth. In the operating position shown in FIGS. 2 and 3, both of the disc gears 17a and 17b are in meshing engagement with the pinion gear 18. This pinion gear 18 and the disc gear 18a are mounted in fixed relationship with respect to one another on a rotatable shaft 22 (see FIG. 3), which is mounted in any suitable bearing means between the plates 10 and 11. In like manner, pinion gear 19 is mounted in fixed relationship on the rotatable shaft 23, which is mounted in any conventional bearing means in face plate 5 and mounting plates 10 and 11, as best seen in FIG. 3.

The drive gear train 16 is caused to rotate in a direction to move the indicating pointers 2–4 in an up-scale direction by a conventional drive means 24 that embodies a well known type of pointer-pusher mechanism. Obviously, alternative types of drive means may be used with the indicator drive and positive-zero reset mechanism of the present invention without impairing its operability. Although interval timing mechanisms and demand indicating pointer-pusher arrangements similar to that incorporated in drive means 24 are generally well known, a brief description of the drive means 24 will now be given in order to help orient the present invention. Thus, it should be understood that power is supplied to drive means 24 from a disc gear 25 which is adapted to be connected in driven relationship with an electro-dynamically driven rotor shaft (not shown) of a conventional watthour meter, when the demand meter assembly illustrated in FIG. 2 is mounted in operating position with respect to such a watthour meter rotor. Gear 25 is stacked onto a rotatably mounted shaft 26 that includes a worm gear section 26a. The worm gear section 26a operates to rotate gear 27, which in turn is stacked onto an axially slidable clutch shaft 28. A clutch disc 29 is locked with set screws 29' on one end of shaft 28 and is adapted to rotate with it. A second clutch disc 29a is mounted on clutch shaft 28 and is biased toward the disc 29 by a compressed coil spring 30. A disc gear 31 is also rotatably mounted on shaft 28 and is driven by it through the friction coupling of a graphited Textolite washer 29" that is compressed between clutch discs 29 and 29a.

Figures 3, 4:
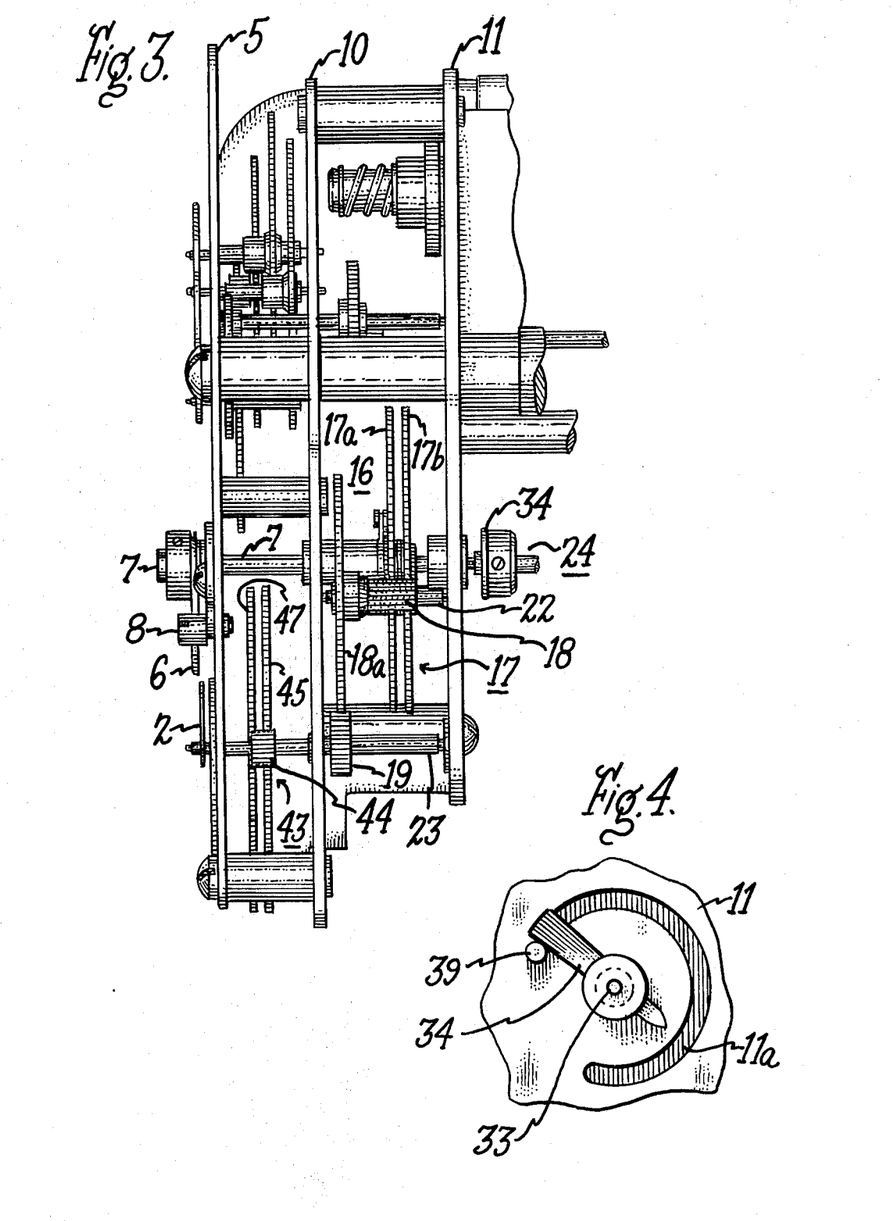
FIG. 3 is an enlarged, fragmentary, bottom elevation view of the indicator drive and positive-zero reset mechanism illustrated in FIG. 2.
FIG. 4 is an enlarged, fragmentary, side elevation view of a pointer-pusher mechanism included in the assembly illustrated in FIG. 2.

When clutch disc 29 is in driving relationship with disc 29a, gear 31 is meshed with a second gear 32 that is mounted in fixed relationship on a rotatable shaft 33, which also mounts a pointer-pusher arm 34 (also, see FIG. 4). Accordingly, when gear 31 drives gear 32 the pointer-pusher arm 34 is rotated, in a manner that will be described more fully below, and drives gear train 26 so it moves indicating pointer 2, as well as pointers 3 and 4, in an up-scale direction.

An interval timing function is afforded by a pivotally mounted sector gear 35 that is mounted in meshing engagement with a pinion gear 36, which is staked on the shaft 33 that supports pointer-pusher 34 and driven gear 32. When a pivotally mounted, cam controlled lever 37 is moved by a rotatable cam 38 to disengage clutch discs 29 and 29a, drive gear 31, pointer-pusher gear 32, pointer-pusher gear 36 and sector gear 35 are returned to their start position by a reset dog cam 38' which wipes the tail of sector gear 35. The rate of rotation of cam 38 is controlled by a synchronous drive motor (not shown), in a manner well known in the art. Those familiar with various conventional types of interval reset mechanisms will understand that the pointer-pusher 34 is adjusted to operate to return to its start position at preset intervals, such as every 15 or 30 minutes. If a more detailed description of the type of interval timer utilized with the preferred embodiment of the present invention is desired, reference may be made to U.S. Pat. No. 3,586,974, which issued June 22, 1971 and is assigned to the assignee of the present invention. That patent describes one form of an interval timer in detail, as well as describing a pointer-pusher drive system similar to the drive means 24 herein, in greater detail than has been presented above.

The driving relationship between drive means 24 and drive gear train 16 is established between the pointer-pusher 34 and a pin 39 that is staked to the second disc gear 17b of gear assembly 17 at a point thereon spaced radially outwardly from the axis of rotation of gear 17b. As seen in FIGS. 2 and 4, the pin 39 extends through a slot 11a in the mounting plate 11. In this form of the invention, the slot 11a extends through an arc of approximately 270° around the axis of shaft 33 on which pointer-pusher 34 is mounted. Therefore, it should be recognized that since the upper end of slot 11a acts as a limit stop for the pin 39 on disc gear 17b, the range of movement of the lever 6 is controlled by the position of the upper end of slot 11a, with respect to pin 39.

Before describing the details of the anti-backlash gear assembly of the invention, the operation of drive means 24 will now be briefly explained, as follows: When in operation, input gear 25 is driven through a given number of rotations in the selected measurement interval of 15 or 30 minutes. This given number of rotations is directly proportional to the power consumption measured by a watthour meter that is connected to input drive gear 25. Consequently, due to the driven relationship of pointer-pusher 34, with respect to input gear 25, the pointer-pusher 34 is rotated in a counter-clockwise direction (as seen in FIG. 4) through an angle that is proportional to such power consumption. The mechanical coupling between gear 25 and pointer-pusher 34 is via gears 26a, 27, 31 and 32, and the clutch discs 29 and 29a, as described above. At the end of each such pre-selected 15 or 30 minute interval, the pivotal lever 37 is actuated to disconnect clutch disc 29a from clutch disc 29. Sector gear 35 then operates to rotate pointer-pusher 34 to its start position. As explained above, when the pin 39 is rotated by pointer-pusher 34 in a counter-clockwise direction (as viewed in FIG. 4) it operates through drive gear train 16 to move indicating pointers 2–4 in an up-scale direction. Therefore, the up-scale movement of indicating pointers 2–4 is directly proportional to the maximum power consumption measured during one of the periodic intervals by the movement of pin 39. Pin 39 and indicating pointer 2 are held in their maximum up-scale positions until they are manually returned to a "start" or zero-indicating position by the operation of lever 6.

In prior art demand meters, it was usually necessary to provide some sort of friction clutch means for mechanically loading the drive gear train 16 in order to maintain it in position, against vibration or other forces that could move the indicating pointers 2–4, thus causing them to show an erroneous measurement. As will become apparent from the following description of the present invention, the anti-backlash gear assembly 17 is effective to accurately maintain the position of indicating pointers 2–4, even when the meter is subjected to vibration, so that such friction loading is not necessary. Consequently, with the present invention, appreciable savings in cost of manufacture and meter operation are realized.

Now that driving means 24 and the drive gear train 16 have been generally described, a preferred mechanism for actuating indicating pointers 2–4 will be explained. For this purpose, reference is made to FIGS. 3 and 4 of the drawing in which there is shown a conventional decade type gear train 43 that is connected to drive the plurality of indicating pointers 2–4 of demand register 1. Decade gear train 43 comprises; a first pinion gear 44 mounted in fixed relationship on shaft 23, which is journaled in mounting plates 10 and 11; a disc gear 45 that is meshed with pinion 44 and is mounted in fixed relationship with respect to a pinion gear 46, both of which are rotatable on a suitable shaft 46a, which is supported between face plate 5 and mounting plate 10; and a disc gear 47 that is meshed with pinion 46 and is mounted in fixed relationship on a rotatably mounted shaft 48, which also supports indicating pointer 4. Of course, the gear ratios of the decade gear train are such that pinion gear 44 makes ten revolutions in order to drive disc gear 45 through one revolution, and pinion gear 46 makes ten revolutions in order to drive disc gear 47 through a single revolution. Appropriate gear ratios are selected for the drive gear train 16 in order to translate the power input detected by input gear 25 into an appropriate indication of kilowatts at dial register 1, as is well known in the demand meter field.

Figure 5:
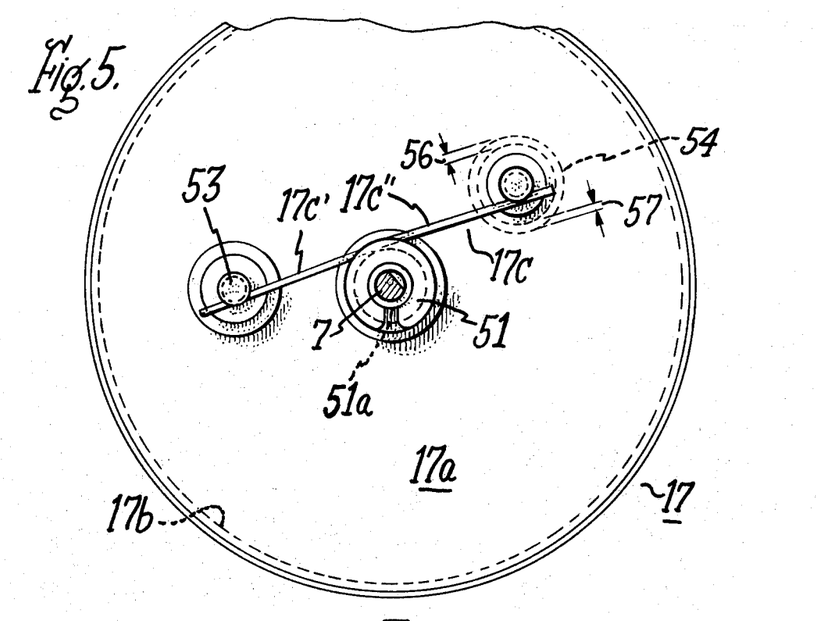
FIG. 5 is a top plan view of a portion of an anti-backlash gear assembly that is incorporated in the mechanism illustrated in FIGS. 2 and 3 above.
Figure 6:
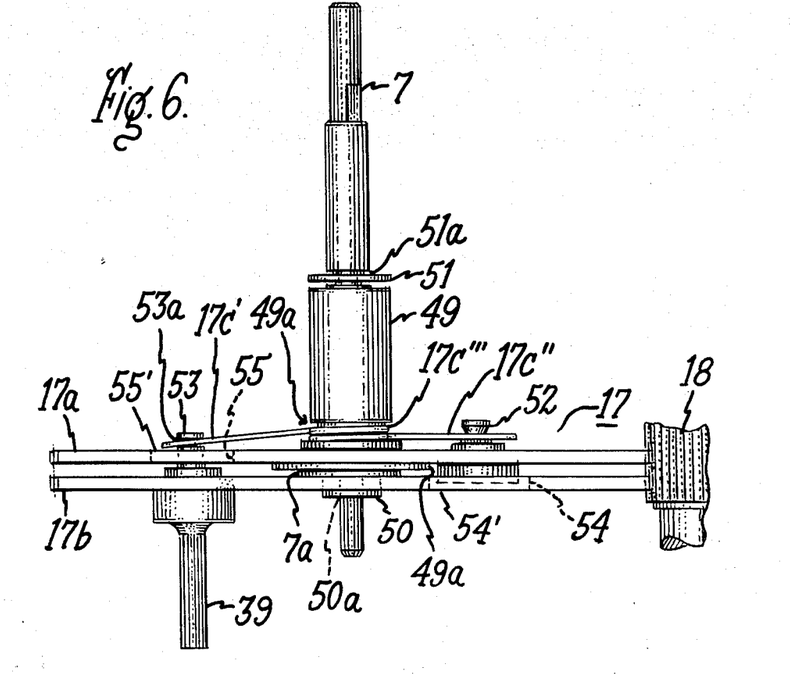
FIG. 6 is a side elevation view of the anti-backlash gear assembly illustrated in FIG. 5.

The indicating drive and positive-zero reset mechanism of the invention will now be described in greater detail. First, the unique features of the anti-backlash gear assembly 17 will be explained with reference to FIGS. 5 and 6 of the drawings. As pointed out above, the assembly 17 comprises first and second disc gears, 17a and 17b, respectively, as well as a spring member 17c. In addition to those components, the assembly 17 includes a hub 49 that is mounted in rotatable relationship on the shaft 7. It should be apparent that the hub 49 could be formed as an integral part of the shaft 7, or it might be a separate member clamped to the shaft 7 by a set screw (not shown), in an alternative form of the invention. However, in the preferred embodiment hub 49 is rotatably mounted on shaft 7 and is restrained from movement in an axial direction by a spring clip 51 positioned in annular slot 51a of shaft 7. A shoulder 7a on shaft 7 limits movement of hub 49 in an axial direction away from clip 51. Disc gear 17a may be staked to hub 49 in any suitable manner, so that both hub 49 and gear 17a rotate together about the shaft 7. The disc gear 17b is staked in fixed relationship to shaft 7, abutting the shoulder 7a. Thus, shoulder 7a and shoulder 49a on hub 49 hold the disc gears 17a and 17b in spaced-apart relationship, as best seen in FIG. 6. When biased into sliding engagement by spring member 17c, in a manner that will be more fully explained below, shoulders 7a and 49a are effective to prevent disc gears 17a and 17b from wobbling with respect to one another.

It should be apparent to those skilled in the art that either gear 17a or gear 17b could be mounted in fixed relationship to shaft 7, so long as the other gear (17a or 17b) is rotatably mounted. However, if gear 17b is rotatably mounted on shaft 7, a second spring clip 50, or similar holding means, mounted in annular channel 50a is provided to limit axial movement of the gear 17b away from shoulder 7a. In such an alternative embodiment, hub 49 would be staked to shaft 7 so gear 17a would rotate with shaft 7. Also, other suitable types of anti-backlash gear assembly might be used in other forms of the invention to afford the functions of assembly 17 described herein. Moreover, although shoulders 7a and 49a are ideally suited to hold the disc gears 17a and 17b in spaced-apart, wobble-free relationship, it should be understood that other spacing means might be substituted for these shoulders. For example, a nylon washer (not shown) might be mounted between the gears 17a and 17b, in lieu of shoulders 7a and 49a.

A first boss element 52 is mounted on the first disc gear 17a radially outward from the axis thereof and a second boss element 53 is mounted on the second disc gear 17b radially outward from its axis. Wall means 54 define an aperture 54' through the first disc gear 17b in a position that is adapted to receive therethrough the second boss element 52. It should be understood that the boss element 52 extends completely through the first disc gear 17a, as depicted in phantom in FIG. 6 of the drawing. Also, it should be understood that in the preferred form of the invention, the second boss element 53 mounted on disc gear 17b is an integral extension of the pin 39. Of course, in other forms of the invention, the boss elements 52 and 53 might be articulated so that separate portions of them could extend from opposite sides of the disc gears (17a and 17b) on which they are mounted.

The boss elements 52 and 53 are adapted to secure spring member 17c in operating position on the anti-backlash gear assembly 17. As illustrated in FIGS. 5 and 6, in the preferred form of the invention, spring member 17c comprises an elongated resilient member that has a first generally straight end portion 17c', a second generally straight end portion 17c'', and a coiled central portion 17c'''. The coiled central portion 17c''' is positioned coaxially around the shaft 7, by being mounted in a reduced-diameter portion 49a of hub 49, as best seen in FIG. 6. Thus, the spring member 17c is locked against axial movement with respect to the shaft 7. It should be understood that the spring member 17c is resiliently biased to cause the respective end portions 17c' and 17c'' to move toward one another, in a biasing direction against the boss elements 52 and 53, respectively, as seen in FIG. 5. Also, as seen in FIG. 5, the first and second generally straight end portions 17c' and 17c'' of spring member 17c are positioned in substantial axial alignment within a range of arcuate movement that is limited in a manner that will now be described.

In addition to the aperture 54' formed through second disc gear 17b, a second aperture 55' is defined through the first disc gear 17a by wall means 55. The second aperture 55' is adapted to receive therethrough the second boss element 53, as shown in FIGS. 5 and 6. Thus, it will be apparent that when the anti-backlach gear assembly 17 is assembled, as it is depicted herein, the range of arcuate movement of rotatably mounted second disc gear 17b with respect to disc gear 17a is limited by the combined distances of separation between opposite sides of the relatively large diameter first boss element 52 and the wall means 54 defining aperture 54'. Actually, in the assembled position of the gear assembly 17 illustrated in FIG. 6, the first boss element 52 is held in spaced-apart relationship from the wall means 54 on second disc gear 17b by the common meshing engagement of the first and second disc gears 17a and 17b with the pinion gear 18. Thus, the spaced-apart relationship between first boss element 52 and the wall means 54 comprises a first distance of separation 56 and a second distance of separation 57, as indicated by the arrows in FIG. 5, between opposite sides of first boss element 52 and the respectively juxtaposed portions of the wall means 54.

In the preferred form of the invention, the combined length of the first and second distances of separation (56 and 57) is at least equal to twice the pitch length of the gear teeth of first disc gear 17a. Also, this combined length of first and second distances of separation (56 and 57) is not greater than six times the pitch length of the gear teeth of the first disc gear 17a, in the preferred embodiment of the invention. These parameters are established to limit the degree of variation in resilient loading that can be applied to the spring member 17c by rotating the first disc gear 17a relative to the second disc gear 17b, prior to the assembly of these gears in their common meshing engagement with gear 18. This unique limiting arrangement affords a convenient means for assuring rapid and economical assembly of the invention, while maintaining a desirable means of standardized loading by spring members, such as the spring member 17c. Ideally, the spring member 17c is pre-biased so that its end portions 17c' and 17c'' are in substantial alignment in their unloaded condition, thus they are easy to inspect prior to assembly, and the above-mentioned limits of arcuate movement, attainable by varying the angular position of first boss element 52 with respect to wall means 54, are effective to desirably limit the degrees of loading that can be applied to spring member 17c in its assembled position. Thus, in the preferred form of the invention, it is not possible to apply an excessive friction loading to the gear 18 of drive gear train 16.

In the operation of anti-backlash gear assembly 17, in its assembled position as illustrated in FIG. 3, the spring member 17c is operable to bias first disc gear 17a and second disc gear 17b in opposite directions with respect to their axes of rotation on shaft 7. Consequently, when the manually rotatable lever 6 is positioned firmly against stop member 8, the anti-backlash gear assembly 17 is effective to prevent any play, or backlash between gears 17a, 17b and pinion 18, from being introduced between any of the plurality of gears of drive gear train 16, or the decade gear train 43 that drives indicating pointers 2, 3 and 4. This freedom from backlash is particularly desirable when lever 6 is operated to return the indicating pointers 2-4 to their zero-indicating position at the end of a month, or other suitable billing period. In prior art demand meters, as explained at the outset, when such a manual resetting operation was made, some steps had to be taken to remove backlash or play from the gear train. However, with the present invention, the anti-backlash gear assembly 17 applies sufficient torque to the initial gears of drive gear train 16 to continuously bias them towards a relationship of firm driving engagement. It should be understood in this regard that the critical gears of drive train 16 are those nearest the lever 6; namely, disc gears 17a and 17b and pinion 18. Therefore, the direction of rotation of the gear train 16 can be reversed to reset the indicating pointer 2 (and pointers 3 and 4) precisely to its zero-indicating position without permanently dislodging any of the plurality of gears from their relationship of firm driving engagement with the other gears.

It will be understood that due to this novel resetting mechanism the relationship of lever 6 with respect to indicating pointer 2 can be accurately and permanently calibrated as a convenient means of calibrating the indicating pointer 2 with respect to its dial 2a. In fact, this unique function is a major feature of the present invention. In this regard, it will be noted that the adjusting means 8a and 9 are operable in combination with the lever arm 6 and drive gear train 16 to accurately calibrate the position of the indicating pointer 2 relative to its register scale 2a, thereby to cause the indicating pointer 2 to be stopped precisely at its zero indicating position, as illustrated in FIG. 1, in response to the lever 6 being rotated into engagement with the stop member 8. In addition, it is important to note that the stop member 8 is readily accessible from the front of face plate 5 so that the stop member 8 can be adjusted by manually rotating the adjusting means 8a and 9 while holding lever 6 against stop member 8, and while also observing the exact position of indicating pointer 2 with respect to its dial register 2a.

A further important feature of the present invention is that the indicator drive and positive-zero reset mechanism, as disclosed, is relatively free from vibration, compared with prior art demand meter mechanisms having related functions. This freedom from vibration is due primarily to two features of the invention. First, since the anti-backlash gear assembly 17 prevents any play from being introduced between the associated meshing gears of drive gear train 16, the effects of vibration on movement of the indicating pointers or gears of the drive gear train cannot be multiplied in the well known manner of overcoming loosely connected series loads, such as those present in a long freight train, for example. As is well known, it is possible to start a relatively long freight train in motion with a relatively small force applied from a single locomotive, due to the fact that each car is started separately as slack is taken up between cars. In like manner, in drive gear trains of prior art demand meters, sufficient play existed between the gears to allow a small vibration of an unbalanced indicating pointer, similar in indicating function to the pointer 2 herein, to introduce a torque to shaft 2' which could be sufficient to cause the pointer to be moved incrementally to drive the respective gears of gear train 6, thus causing an erroneous reading to be indicated by dial register 1. Since no such slack can exist in gear train 16 of the present invention, ther inertial loading of the entire gear train 16 is active to hold the indicating pointer 2 in operating position, thus, no further mechanical loading or friction clutch is necessary to assure the accurate positioning of indicating pointer 2.

It should also be understood that the resilience of spring member 17c makes it possible for a very small, continuously applied, mechanical force to be used to start the entire gear train 16. When drive means 24 moves pointer-pusher 34 to drive pin 39, the second disc gear 17b can be rotated relative to first disc gear 17a, to the extent that gear 18 allows freedom of movement between the disc gears 17a and 17b. This slight degree of movement is immediately compensated for by the corrective force of the spring member 17c which returns the disc gears 17a and 17b to their original positions relative to gear 18.

A further important feature of the invention is the novel arrangement of the component parts of anti-backlash gear assembly 17. Specifically, as shown in FIG. 6, elongated spring 17c is mounted so that it is effective to continuously bias the shoulder 7a on shaft 7 into sliding engagement with shoulder 49a on hub 49. This biasing relationship is accomplished by positioning a spring detent 53a in boss element 53 in a plane relative to the plane in which annular channel 49a lies so that the elongated end 17c' of the spring member 17c exerts a force on boss element 53 that tends to move it axially inward in relation to the shaft 7. Since boss element 53 is directly connected to disc gear 17b and thereby to shoulder 7a, and hub 49 is directly connected to the central portion 17c''' of spring member 17c, it can be seen that the shoulders (7a and 49a) are maintained in engagement by spring member 17c. Therefore, disc gears 17a and 17b are prevented from wobbling on the shaft 7, even if considerable tolerance exists between the bore of hub 49 and shaft 7.

Finally, the present invention includes an indicating pointer 2 that is shaped generally in the form of an isosceles triangle, as seen in FIG. 1. This uniquely shaped indicating pointer 2 is mounted in self-counterbalancing relationship on the rotatable shaft 2' by being clipped to the shaft in any well known manner. Due to the self-counterbalancing relationship of indicating pointer 2, the face plate 5 of the demand meter may be mechanically vibrated without causing the weight of the indicating pointer 2 to exert a rotation-producing torque on the rotatable shaft 2'. It has been found that it is not necessary to provide such self-counterbalancing indicating pointers for the pointers 3 and 4, because the gear ratio of the decade gear train 43 is sufficient to prevent these pointers from rotating in response to mechanical vibration.

Those skilled in the art will recognize that various modifications and alternative embodiments of the invention may be made without departing from its true scope; therefore, it is my intention to define the spirit and true scope of the invention in the following attached claims.

What I claim as new and desire to secure by Letters Patent of the United States is:

1. An indicator drive and positive-zero reset mechanism for a demand meter comprising;
    a dial register having a scale with a zero indicating position and having an indicating pointer rotatably mounted to cooperate with the scale to indicate a measurement by the meter,
    a drive gear train including a plurality of meshing gears operatively coupled to rotate said pointer in response to the gear train being driven,
    drive means operatively coupled to drive said gear train in a forward direction thereby to move said pointer in an up-scale direction,
    a lever coupled in driving relationship to said gear train, said lever being manually rotated to drive said gear train in a reverse direction thereby to move said pointer in a down-scale direction to its zero-indicating position,
    a stop member mounted adjacent said lever and operable to arrest rotation of the lever when contacted by it,
    adjusting means for manually adjusting the position of said stop member relative to said lever, thereby to vary the point in the range of rotation of said lever at which it contacts the stop member and is arrested during an indicating-pointer-reset operation,
    said drive gear train including an anti-back-lash gear assembly that is operable to continuously bias the meshing gears thereof nearest said lever toward a relationship of firm driving engagement with one another, whereby the direction of rotation of said gear train can be reversed to reset the indicating pointer precisely to its zero-indicating position without permanently dislodging any of the plurality of gears from their relationship of firm driving engagement with the other gears, said gear assembly comprising:
    a rotatably mounted shaft,
    first and second disc gears mounted in common meshing engagement with another gear of said drive gear train, said first disc gear being mounted in fixed relationship with respect to said shaft, and
    an elongated resilient spring member having first and second generally straight end portions and a coiled central portion through which said shaft passes, said first and second disc gears being positioned substantially coaxially on said shaft in relatively rotatable relationship, and said spring member being coupled to both said first and second disc gears to bias them in opposite directions of rotation,
    said adjusting means being operable in combination with said lever arm and said gear train to accurately calibrate the position of said indicating pointer relative to said register scale, thereby to cause the indicating pointer to be stopped precisely at its zero-indicating position in response to said lever being rotated into engagement with the stop member.

2. An invention as defined in claim 1 wherein said indicating pointer is shaped generally in the form of an isosceles triangle, and wherein said indicating pointer is mounted in self-counterbalancing relationship on a rotatable shaft, thereby to enable the meter to be mechanically vibrated without causing the weight of said indicating pointer to exert a rotation-producing torque on said rotatable shaft.

3. An invention as defined in claim 1 including a hub, said hub being mounted on said shaft in fixed relationship to it, said first disc gear being mounted on said hub.

4. An invention as defined in claim 1 including; a first boss element mounted on the first disc gear radially outward from the axis thereof, a second boss element mounted on the second disc gear radially outward from the axis thereof, and wall means defining an aperture through said second disc gear, said aperture being positioned to receive therethrough said first boss element; said first and second end portions of said spring member being positioned, respectively, in said biasing relationship against said first and second boss elements.

5. An invention as defined in claim 4 wherein said first boss element is held in spaced-apart relationship from said wall means by said common meshing engagement of the first and second disc gears with another gear, said spaced-apart relationship comprising a first and a second distance of separation between opposite sides of the first boss element and the respectively juxtaposed portions of said wall means, the combined length of said first and second distances of separation being at least equal to twice the pitch length of the gear teeth of said first disc gear.

6. An invention as defined in claim 5 wherein the combined length of said first and second distances of separation is no greater than six times the pitch length of the gear teeth of said first disc gear, thereby to limit the degree of variation in resilient loading that can be applied to said spring member by rotating the first gear relative to the second disc gear prior to the assembly of said gears in said common meshing engagement with another gear.

7. An invention as defined in claim 6 wherein the first and second generally straight end portions of said spring member are positioned in substantially axial alignment within a range of arcuate movement defined by said combined length of the first and second distances of separation.

* * * * *

UNITED STATES PATENT OFFICE
CERTIFICATE OF CORRECTION

Patent No. 3,763,432           Dated  2 October 1973

Inventor(s)  Donald M. Ham

It is certified that error appears in the above-identified patent and that said Letters Patent are hereby corrected as shown below:

Col. 2, line 22, "water" should be --meter--.
Col. 4, line 41, "housing" should be --mounting--.
Col. 5, lines 37 and 40, "stacked" should be --staked--.
Col. 8, line 63, "anti-backlach" should be --anti-backlash--.
Col. 10, line 57, "ther" should be --the--.
Col. 14, line 2, after "first" insert --disc--.

Signed and sealed this 2nd day of April 1974.

(SEAL)
Attest:

EDWARD M. FLETCHER, JR.
Attesting Officer

C. MARSHALL DANN
Commissioner of Patents